United States Patent
Honda et al.

(10) Patent No.: US 7,483,843 B2
(45) Date of Patent: Jan. 27, 2009

(54) UPSKILLING PLAN PROPOSING METHOD, UPSKILLING PLAN PROPOSING SYSTEM, AND COMPUTER-READABLE MEDIUM

(75) Inventors: Kazuaki Honda, Ota (JP); Hiroshi Kuzumaki, Ota (JP); Akio Fujino, Ota (JP)

(73) Assignee: Fujitsu Limited, Kawasaki (JP)

( * ) Notice: Subject to any disclaimer, the term of this patent is extended or adjusted under 35 U.S.C. 154(b) by 1162 days.

(21) Appl. No.: 10/284,300

(22) Filed: Oct. 31, 2002

(65) Prior Publication Data

US 2003/0182179 A1 Sep. 25, 2003

(30) Foreign Application Priority Data

Mar. 20, 2002 (JP) ............................. 2002-078600

(51) Int. Cl.
*G06F 11/34* (2006.01)
(52) U.S. Cl. ...................................................... 705/11
(58) Field of Classification Search ..................... None
See application file for complete search history.

(56) References Cited

U.S. PATENT DOCUMENTS

| | | | | |
|---|---|---|---|---|
| 5,416,694 A | * | 5/1995 | Parrish et al. | 705/8 |
| 5,684,964 A | * | 11/1997 | Powers et al. | 705/11 |
| 5,909,669 A | * | 6/1999 | Havens | 705/11 |
| 5,918,207 A | * | 6/1999 | McGovern et al. | 705/1 |
| 6,119,097 A | * | 9/2000 | Ibarra | 705/11 |
| 6,275,812 B1 | * | 8/2001 | Haq et al. | 705/11 |
| 6,524,109 B1 | * | 2/2003 | Lacy et al. | 434/219 |
| 6,537,072 B2 | * | 3/2003 | Kanevsky et al. | 434/219 |
| 6,546,230 B1 | * | 4/2003 | Allison | 434/350 |
| 6,606,480 B1 | * | 8/2003 | L'Allier et al. | 434/362 |
| 6,735,570 B1 | * | 5/2004 | Lacy et al. | 705/7 |
| 6,857,877 B1 | * | 2/2005 | Watanabe | 434/219 |
| 6,996,366 B2 | * | 2/2006 | L'Allier et al. | 434/362 |
| 7,181,413 B2 | * | 2/2007 | Hadden et al. | 705/11 |
| 7,346,542 B2 | * | 3/2008 | Suzuki | 705/11 |

(Continued)

FOREIGN PATENT DOCUMENTS

JP 08077246 A * 3/1996

(Continued)

OTHER PUBLICATIONS

Muhlemeyer, Peter et al., The competitive factor: training and development as a strategic management task Journal of Workplace Learning, vol. 9, No. 1, 1997.*

(Continued)

*Primary Examiner*—Scott L Jarrett
(74) *Attorney, Agent, or Firm*—Staas & Halsey LLP (57) ABSTRACT

Increasing performance companies whose business performance increases are selected among a number of companies and a growth ratio of the skill holding amount (an upskilling ratio) in each skill field is calculated. An average of the upskilling ratios of the increasing performance companies is found for each skill field. The average is used as a standard upskilling ratio. An upskilling ratio of a client company that requests an analysis in each skill field is compared with the standard upskilling ratio. This makes it clear that the skill field being important for the client company but insufficient in the skill holding amount. Then a plan to supplement the shortage can be drafted.

5 Claims, 8 Drawing Sheets

U.S. PATENT DOCUMENTS

| | | | | |
|---|---|---|---|---|
| 2002/0062242 | A1* | 5/2002 | Suzuki | 705/10 |
| 2002/0077884 | A1* | 6/2002 | Sketch | 705/12 |
| 2002/0103682 | A1* | 8/2002 | Stemmer et al. | 705/7 |
| 2002/0142274 | A1* | 10/2002 | Fujino | 434/219 |
| 2003/0182178 | A1* | 9/2003 | D'Elena et al. | 705/11 |
| 2003/0187723 | A1* | 10/2003 | Hadden et al. | 705/11 |

FOREIGN PATENT DOCUMENTS

| | | | |
|---|---|---|---|
| JP | 08110752 | * | 4/1996 |
| JP | 10063716 | * | 3/1998 |
| JP | 2001-084308 | * | 2/2001 |
| JP | 2001-319041 | | 11/2001 |
| JP | 2002-072848 | * | 3/2002 |

OTHER PUBLICATIONS

Penson, Paul G., Improved performance through worker training Jacksonville Business Journal, Jun. 26, 1998, Abstract.*

Brown, Jeff et al., Skillful inventory Bank Marketing, vol. 31, No. 8, Aug. 1999.*

Marcia, L., Use you head when identifying skill gaps Workforce, Vo. 79, No. 3, Mar. 2000.*

Training Benchmarks The Controller's Report, vol. 5, May 2001.*

Rossett, Allison, Assess for Success Training and Development Journal, May 1989, vol. 43, No. 5, pp. 55-59.*

Wircenski, Jerry L. et al., Assessing Training Nees at Texas Instruments Training and Development Journal, Apr. 1989, vol. 43, No. 4, pp. 61-63.*

Tollison, Peggy, Asessing TQM Training Needs The Journal for Quality and Participation, vol. 15, No. 1, Jan./Feb. 1992.*

Aloain, Dena et al., How to Create a High-Performance Training Plan Training & Development, vol. 47, No. 11, Nov. 1994, pp. 43-44.*

Sleezer, Catherine M., Training Needs Assessment at Work: a Dynamic Process Human Resource Development Quarterly, vol. 4, No. 3, Fall 1993, pp. 247-264.*

Filipczak, Bob, Skills-assessment software delivers one-two punch Training, vol. 32, No. 7, Jul. 1995.*

McArdle, GEH, Conducting a Needs Assessment for Your Work Group Supervisory Management, vol. 41, No. 3, Mar. 1996, p. 6.*

Shafer, Michael S. et al., An Assessment of the Training Needs of Rehabilitation and Community Mental Health Workers In A Six-State Region, Psychiartric Rehabilitation Journal, vol. 23, No. 2, Fall 1999, pp. 161-169.*

McClelland, Same, A Systems Approach to Needs Assessment Training & Development, vol. 46, No. 8, Aug. 1992.*

Taylor, Paul J. et al., A new integrated framework for training needs analysis Human Resource Management Journal, vol. 8, No. 2, 1998, pp. 29-50.*

Johnson, Tatyanna et al., A Comprehensive Integrated Framework For Training Needs Analysis Medsurg Nursing, vol. 9, No. 5, Oct. 2000, pp. 265-268.*

Heck, Ron, Corporate Environmental Education and Training University of Calgary, Jul. 2000.*

Stasz, Cathleen, Assessing skills for work: two perspectives Oxford Economic Papers, vol. 53, No. 3, Jul. 2001, pp. 385-405.*

Lubke, Jean Elizabeth, Employee Development Needs Assessment/ Analysis Process: A Practical Inquiry The University of Minesota, Oct. 2001.*

Mathis, Robert L. et al., Personnel/Human Resource Management Fifth Edition West Publishing Company, 1998, ISBN: 0-314-62317-5.*

Murphy, Patty, Never Too Late To Learn☐☐American Printer, vol. 203, No. 6, Sep. 1989.*

Sullican, Richard S., The Competency-Based Approach to Training☐☐U.S. Agency for International Development, Sep. 1995.*

Arthur Andersen Virtual Learning Network To Focus Competency Management Through Agreement with SkillScape☐☐Business Wire, Aug. 22, 2000.*

Woods, W. Longmire et al., Development of a competency based training programme to support multidisciplinary working in a combined biochemistry/maematology laboratory, Journal of Clinical Pathology, vol. 53, 2000.*

Cooper, Kenneth Carlton, Effective Competency Modeling & Reporting AMA Publications, 2000, ISBN: 0-8144-0548-7.*

Overview of SkillScape Competency Manager SkillScape, Inc.*

Pratt, Allison, Performance feedback and a token economy to increase telemarketing sales skills in a thrift institution City University of New York, AAT 9029971, 1990, Abstract.*

"Making the Best Use of E-Learning for Operation Strategy of a Company," Solution IT, Dec. 2001, pp. 120 and 121.

Notice of Reasons for Rejection issued on Oct. 4, 2005 in corresponding Japanese Application No. 2002-078600.

* cited by examiner

<Corporate Performance DB 11> (Unit: $)

| Business Category | Scale | Company Name | 2000/09 | | 2001/03 | | 2001/09 | |
|---|---|---|---|---|---|---|---|---|
| | | | Amount of Sales | Ordinary Profit | Amount of Sales | Ordinary Profit | Amount of Sales | Ordinary Profit |
| Independent | Large Company | C01 | 458,124,750 | 14,273,210 | 472,591,830 | 18,127,580 | 503,217,460 | 37,839,640 |
| | Large Company | C02 | 301,965,210 | 12,323,290 | 323,762,830 | 13,173,730 | 372,491,350 | 14,329,560 |
| | Large Company | C03 | | | | | 292,194,310 | 53,291,040 |
| | Medium Company | C11 | ... | ... | ... | ... | 18,931,290 | 1,041,290 |
| | Medium Company | C12 | ... | ... | ... | ... | 16,537,650 | 907,850 |
| | Small Company | C21 | ... | ... | ... | ... | 2,133,200 | 122,190 |
| | Small Company | C22 | ... | ... | ... | ... | 1,742,310 | 15,810 |
| User-affiliated | Large Company | C31 | ... | ... | ... | ... | 97,043,010 | 8,153,780 |
| | Large Company | C32 | ... | ... | ... | ... | 88,652,410 | 4,993,270 |
| | Large Company | C33 | ... | ... | ... | ... | 84,279,850 | 4,212,160 |
| | Medium Company | C41 | ... | ... | ... | ... | 14,315,230 | 1,065,380 |
| | Medium Company | C42 | ... | ... | ... | ... | 12,134,690 | 762,730 |
| | Small Company | C51 | ... | ... | ... | ... | 1,633,200 | 104,380 |
| | Small Company | C52 | ... | ... | ... | ... | 1,542,130 | 93,270 |

FIG.3

<Skill Holder Table 12>

| Skill Holder of JAVA | Level |
|---|---|
| K | 5 |
| L | 5 |
| M | 4 |
| N | 4 |
| P | 4 |
| Q | 3 |
| R | 3 |
| S | 3 |
| T | 2 |
| X | 2 |
| Y | 1 |
| Z | 1 |

FIG.4

<Skill-by-Company DB 13>

| Skill Field | Skill Holding Amount | | |
|---|---|---|---|
| | 2000/09 | 2000/03 | 2001/09 |
| UNIX | 18 | 20 | 23 |
| C++ | 10 | 19 | 30 |
| JAVA | 15 | 31 | 37 |
| DB | 20 | 23 | 25 |

<Learning Cost Table 14>

| JAVA Learning Course | Entry Course | Intermediate Course I | Intermediate Course II | Advanced Course I | Advanced Course II |
|---|---|---|---|---|---|
| Level-up | 0→1 | 1→2 | 2→3 | 3→4 | 4→5 |
| Cost ($) | 1000 | 450 | 650 | 300 | 250 |

FIG.8

<Level-up Pattern Table 15>

| Level-up Pattern | | Cost for Level-up | Cost for One Grade Level-up | Rank of Cost for One Grade Level-up |
|---|---|---|---|---|
| Identifier | Pattern | | | |
| a | 1→2 | 450 | 450 | 6 |
| b | 1→2→3 | 1100 | 550 | 9 |
| c | 1→2→3→4 | 1400 | 466.7 | 7 |
| d | 1→2→3→4→5 | 1650 | 412.5 | 5 |
| e | 2→3 | 650 | 650 | 10 |
| f | 2→3→4 | 950 | 475 | 8 |
| g | 2→3→4→5 | 1200 | 400 | 4 |
| h | 3→4 | 300 | 300 | 3 |
| i | 3→4→5 | 550 | 275 | 2 |
| j | 4→5 | 250 | 250 | 1 |

FIG.9

<Upskilling Table 16>

| Number | Upskilling Pattern | | Target | | Upskilling Amount | | Cost ($) | |
|---|---|---|---|---|---|---|---|---|
| | Identifier | Pattern | ID | Level after Upskilling | Individual | Accumulation | Individual | Accumulation |
| 1 | j | 4→5 | M | 5 | 1 | 1 | 250 | 250 |
| 2 | j | 4→5 | N | 5 | 1 | 2 | 250 | 500 |
| 3 | j | 4→5 | P | 5 | 1 | 3 | 250 | 750 |
| 4 | i | 3→4→5 | Q | 5 | 2 | 5 | 550 | 1,300 |
| 5 | i | 3→4→5 | R | 5 | 2 | 7 | 550 | 1,850 |
| 6 | i | 3→4→5 | S | 5 | 2 | 9 | 550 | 2,400 |
| 7 | a | 1→2 | Y | 2 | 1 | 10 | 450 | 2,850 |

FIG.10

| | Learning Courses to be attended | | |
|---|---|---|---|
| Name | Learning Course | Upskilling Level | Cost ($) |
| N : | JAVA Advanced-level II | +1 | 250 |
| N : | JAVA Advanced-level II | +1 | 250 |
| P : | JAVA Advanced-level II | +1 | 250 |
| Q : | JAVA Advanced-level I | +1 | 300 |
| : | JAVA Advanced-level II | +1 | 250 |
| R : | JAVA Advanced-level I | +1 | 300 |
| : | JAVA Advanced-level II | +1 | 250 |
| S : | JAVA Advanced-level I | +1 | 300 |
| : | JAVA Advanced-level II | +1 | 250 |
| Y : | JAVA Intermediate-level I | +1 | 450 |
| | Total | +10 | 2850 |

UPSKILLING PLAN PROPOSING METHOD, UPSKILLING PLAN PROPOSING SYSTEM, AND COMPUTER-READABLE MEDIUM

BACKGROUND OF THE INVENTION

1. Field of the Invention

The present invention relates to a skill analysis method to analyze skills of members in an organization such as a company or the like and to a skill analysis program.

2. Prior Art

In late years, technical innovation and social change cause the situation in which a skill required before has been unimportant and another skill has been important in an organization such as a company or a department of a company with increasing frequency. In response to the situation, a company should develop skills of workers in actually required skill fields.

However, it is difficult that a company finds the skill fields to be developed based on the present situation.

SUMMARY OF THE INVENTION

An object of the present invention is to provide a skill analysis method for analyzing skills of members in an organization such as employees in a company to extract skill fields important for the organization.

A skill analysis method according to the present invention is executed by a computer that includes a memory portion. The method includes:

a first calculating step for calculating an upskilling ratio that is a ratio of variation in a skill holding amount of an organization during a predetermined time period based on information about skill holding amounts of a plurality of members in the organization in a predetermined skill field;

a comparing step for comparing the calculated upskilling ratio to a standard upskilling ratio in the predetermined skill field that has been stored in the memory portion; and a second calculating step for calculating a required upskilling amount that is an increment of the skill holding amount required for the organization based on a result of the comparing step.

With this method, it is determined whether the skill holding amount is insufficient or not in the skill field in question. If the skill holding amount is insufficient, the required skill holding amount that should be supplemented is calculated.

Further, the first calculating step, the comparing step and the second calculating step may be executed for a plurality of skill fields. In such a case, the skill field that is important for the company becomes clear.

The standard upskilling ratio may be determined based on an upskilling ratio in the predetermined skill field of another organization that has high corporate performance and a high growth ratio of the skill holding amount in the predetermined skill field.

Alternatively, the standard upskilling ratio may be determined based on an average of growth ratios of a plurality of other organizations whose corporate performance increases in the predetermined skill field.

The method may further includes:

a selecting step for selecting a plan with minimum cost among plans to improve the skills of members of the organization in order to increase the skill holding amount by the increment.

The above described method is also available as a computer program executed on a server computer or a system consisting of the server computer and the program thereof.

DESCRIPTION OF THE PREFERRED EMBODIMENTS

Figure 1:
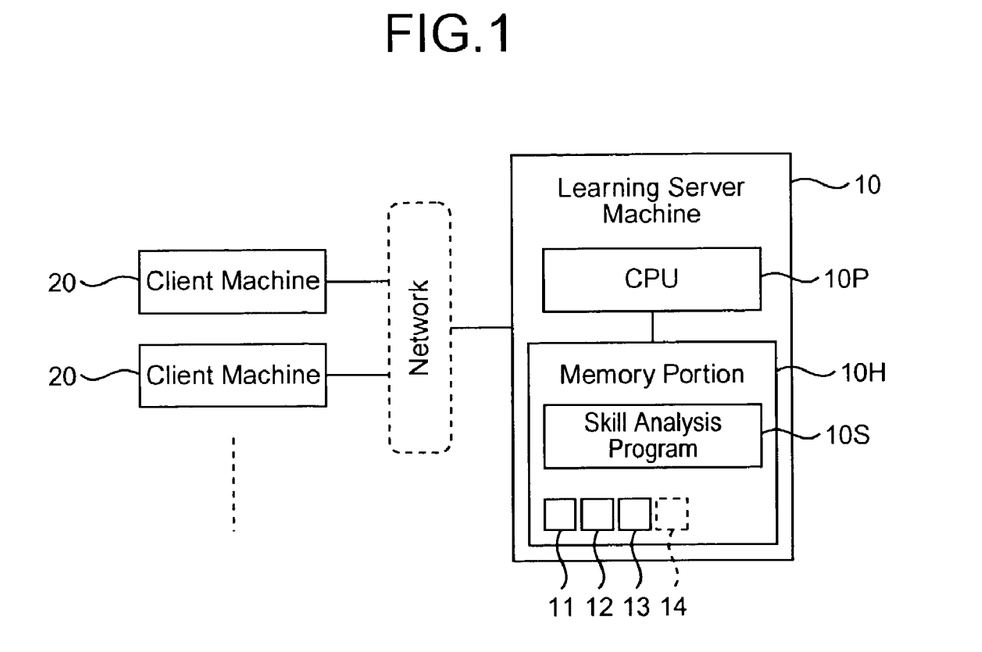
FIG. 1 is a block diagram showing the entire system of a skill analysis system of an embodiment according to the present invention.

An embodiment of the present invention will be described with reference to the drawings. FIG. 1 is a block diagram of the entire system including a server machine 10 as a skill analysis device of the embodiment. The server machine 10 is a server computer that can connect to client machines 20 of a plurality of companies through a network like the Internet and executes a skill analysis, which will be described below with reference to FIG. 5, in response to request from a company.

Further the server machine 10 is provided with a CPU 10P and a memory portion (storage) 10H having a hard disk and a memory that are connected to the CPU 10P. A skill analysis program 10S is installed in the memory portion 10H. The skill analysis program 10S includes a Web server program module, a server side program module and a program module to execute a skill analysis process described below.

For example, the client machine 20 consists of a personal computer in which a Web browser program is installed. A person in charge in a company accesses the server machine 10 from the client machine 20 to transmit information with respect to the corporate performance and the skills of its workers. The companies that transmit their information to the server machine 10 are allowed to request the skill analysis described below with reference to FIG. 5.

Figure 2:
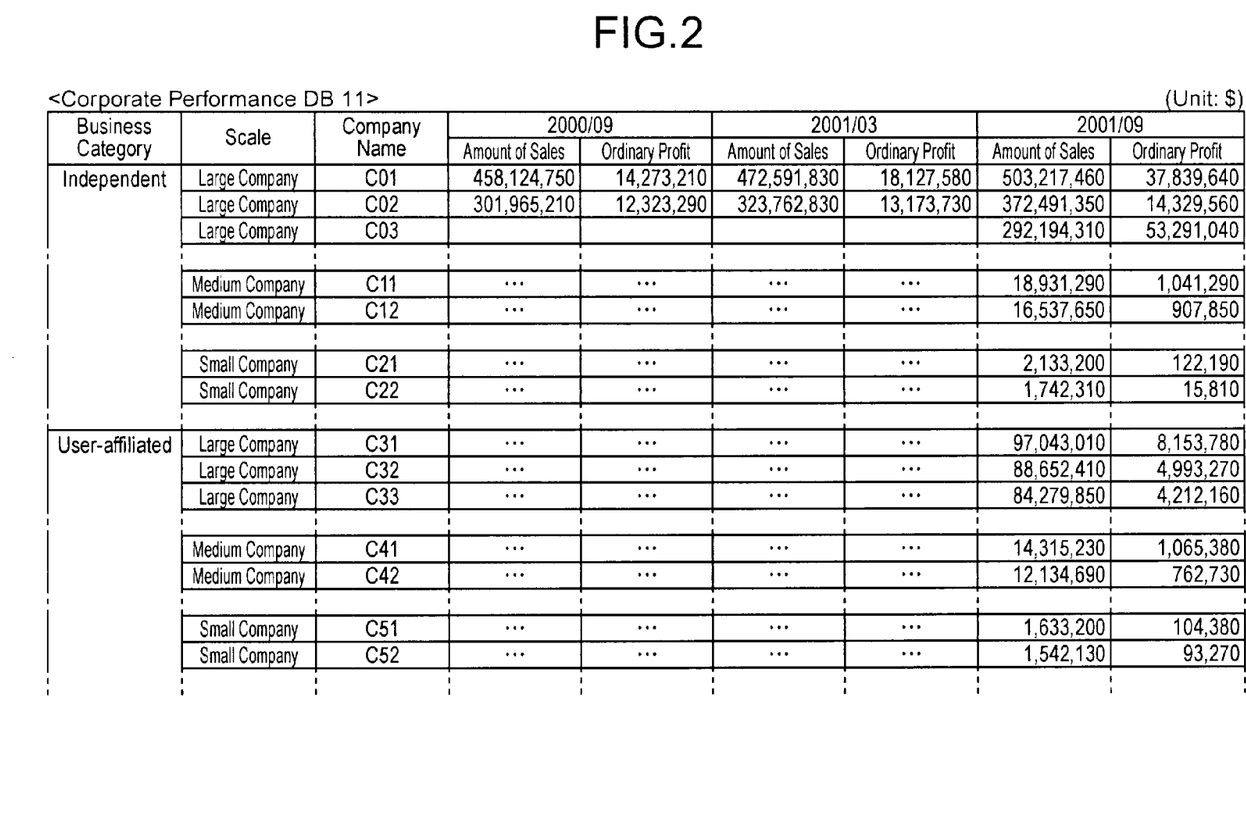
FIG. 2 shows a data layout of a corporate performance DB.

The server machine 10 obtains the information transmitted from the client machine 20 and stores it into the memory portion 10H. Specifically, the information with respect to the corporate performance is stored in a corporate performance DB 11 installed in the memory portion 10H. FIG. 2 shows a data layout of the corporate performance DB11. In the corporate performance DB11, each company is uniquely identified by "Company Name".

Further, in the corporate performance DB 11, companies are classified by their "Business Category" and "Scale". Specifically, the companies are classified into "Independent" company whose clients do not related to the business affiliation or "User-affiliated" company that mainly undertakes jobs from a parent company with respect to the "Business Category". The companies are classified into "Large Company", "Medium Company" or "Small Company" with respect to the "Scale".

The business performances of the respective companies are stored in the corporate performance DB 11 as time-series data. Specifically, "Amount of Sales" and "Ordinary Profit" are recorded every half period. Instead, quarterly performance or performance of another unit of period may be recorded.

Figure 3:
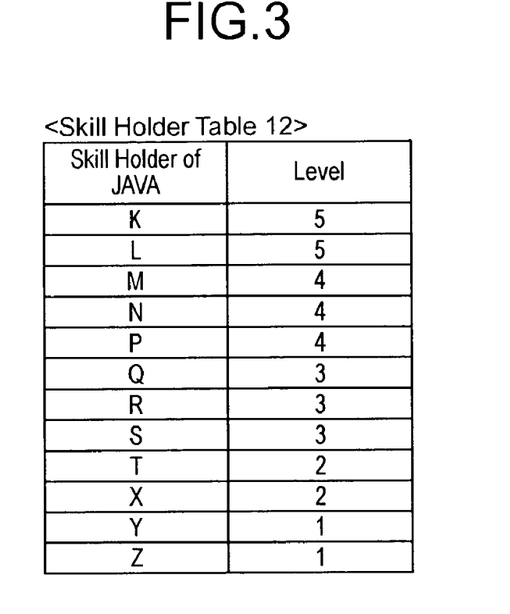
FIG. 3 shows a data layout of a skill holder table.

On the other hand, the information with respect to the skills of workers transmitted by the client device 20 is stored in a skill holder table 12 in the memory portion 10H. FIG. 3 shows a data layout of the skill holder table 12. The skill holder table 12 is created for each skill field of each company and includes information about "Level" of skill holders in the skill field. In the example shown in FIG. 3, names of skill holders and their level on a 1-to-5 scale with respect to the skill field of "JAVA", which is trademark of Sum Microsystems, Inc., are stored in the skill holder table 12. The skill holder with higher level is assumed to have a higher skill.

The server machine 10 calculates a skill holding amount in the filed of the skill of the company in question based on the skill holder table 12. Specifically, the server machine 10 refers to the skill holder table 12 to count the number of workers with the skills of the respective levels. Then the server machine 10 calculates a weighted value that is the product of the counted number of workers multiplied by the predetermined weight for each level and finds the total sum of the weighted values of all the levels as the skill holding amount in the skill field of the company in question.

In the example shown in the skill holder table 12 shown in FIG. 3, there are two workers of level "5", three workers of level "4", three workers of level "3", two workers of level "2" and two workers of level "1". Assuming that a value of the level is equal to a weight, the skill holding amount in the skill field of JAVA of the company in question becomes 37 according to the following calculation.

$$5 \times 2 + 4 \times 3 + 3 \times 3 + 2 \times 2 + 1 \times 2 = 37$$

Figure 4:
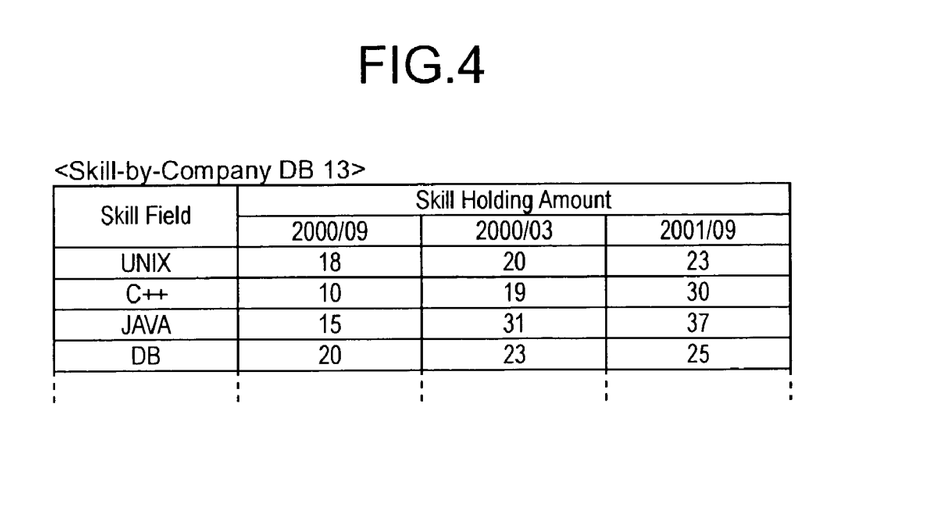
FIG. 4 shows a data layout of a skill-by-company DB.

A skill-by-company DB 13 shown in FIG. 4 is stored in the memory portion 10H of the server machine 10. The server machine 10 calculates the skill holding amount for each skill field of each company every half period and stores it in the skill-by-company DB 13.

FIG. 4 shows a data layout of one record of the skill-by-company DB 13. One record in the skill-by-company DB 13 corresponds to one company and contains the fields of "Skill Field" and "Skill Holding Amount". In the example of FIG. 4, "UNIX", which is trademark of the Open group registered in United States and other countries, "C++", "JAVA" and "DB" are registered as the "Skill Field". Other items may be registered. The skill holding amounts of the skill fields of the company in question are stored every half period in the field of "Skill Holding Amount".

The server machine 10 refers to the skill-by-company DB 13 to calculate a upskilling ratio, which is a ratio of increment of the skill holding amount in half period, for each skill field. The calculation aims to know the upskilling ratio in the specific half period for each skill field. The skill-by-company DB 13 shown in FIG. 4 shows that the company in question increases the skill holding amount of "JAVA" from 31 to 37 in the half period between March through September, 2001. The upskilling ratio is calculated by the following equation.

$$37/31 \times 100(\%) - 100 = 19(\%)$$

Namely, the skill holding amount of "JAVA" increases 19% in the half period in this company.

In general, a company attempts to find an important skill field based on technical innovation and a direction of the market and to increase the skill holding amount of the important skill field. However, not all companies increase the skill holding amount in the absolutely important skill field. Although the companies that increase the skill holding amount in the absolutely important skill field extend the business performance, the business performance of the other companies is contemplated to be depressed. Therefore, if the upskilling ratio of the underperforming company matches the upskilling ratio of the company whose business performance increases (increasing performance companies) in each skill field, the business performance of the underperforming company can be improved.

Figure 5:
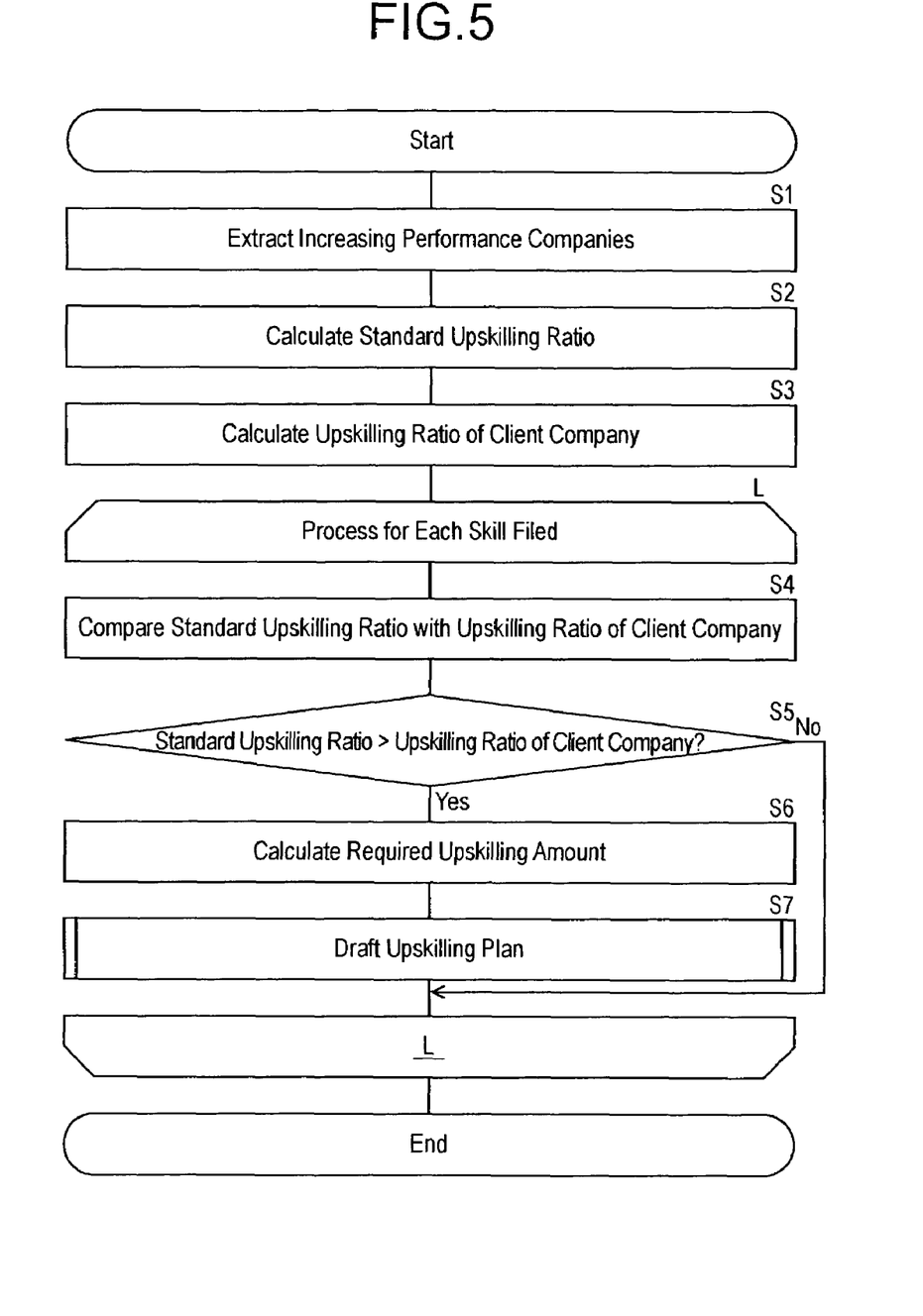
FIG. 5 is a flowchart showing the method of the embodiment.

The server machine 10 analyzes the skills in the respective companies and executes the process for drafting a plan to improve a skill condition according to the flowchart shown in FIG. 5. The server machine 10 starts the process of flowchart in FIG. 5 in response to a request from a client company.

In the flowchart, the server machine 10 searches the corporate performance DB 11 to extract increasing performance companies that are identical in category and scale to the client company that commissions analysis (S1). For instance, a company whose growth rate in the amount of sales is larger than a predetermined value and growth rate in the corporate performance is larger than a predetermined value in the most recent half period is distinguished as the increasing performance company.

Next, the server machine 10 calculates a upskilling ratio in each skill field of each increasing performance company extracted at S1 and finds a standard upskilling ratio that is an average of the upskilling ratios of the increasing performance companies (S2). The upskilling ratio is calculated by the above described method. Further, the sever machine 10 calculates the upskilling ratio of the client company by the same method (S3).

After that, the server machine 10 executes a process of a loop L for each skill field. That is, one round of the process of the loop L is executed for one skill field and the process of the loop L is repeated until the processes for all the skill fields are finished.

In the loop L, the server machine 10 compares the standard upskilling ratio with the upskilling ratio of the client company (S4) and branches the process based on the compared result (S5). Specifically, when the upskilling ratio of the client company is larger than the standard upskilling ratio (S5, No), the server machine 10 judges that the client company accumulates sufficient skills in the skill field in question and immediately finishes the process of the loop L in this round. On the other hand, when the upskilling ratio of the client company is smaller than the standard upskilling ratio (S5, Yes), the server machine 10 judges that the client company is needed to improve the skill in the skill field in question and executes the processes at S6 and S7 before finishing the process of the loop L in this round.

The server machine 10 calculates a required upskilling amount that is a difference between the actual skill holding amount and the skill holding amount required to match the upskilling ratio of the client company with the standard upskilling ratio in the target skill field. For instance, assuming that the skill holding amount of the client company has increased from "31" half year ago to "37" at present and the standard upskilling ratio is 52%, the skill holding amount required to match the upskilling ratio of the client company with the standard upskilling ratio is nearly equal to "47" as follows.

$$31 \times (1 + 52/100) \approx 47$$

Since the actual skill holding amount is "37", the required upskilling amount is equal to "10".

At the next step S7, the server machine 10 drafts a upskilling plan to improve the worker's skill so that the skill holding amount in the target skill field rises by the required upskilling amount calculated at S6. The upskilling plan suggests that the workers should attend the learning course to improve the worker's skill.

Figure 6:
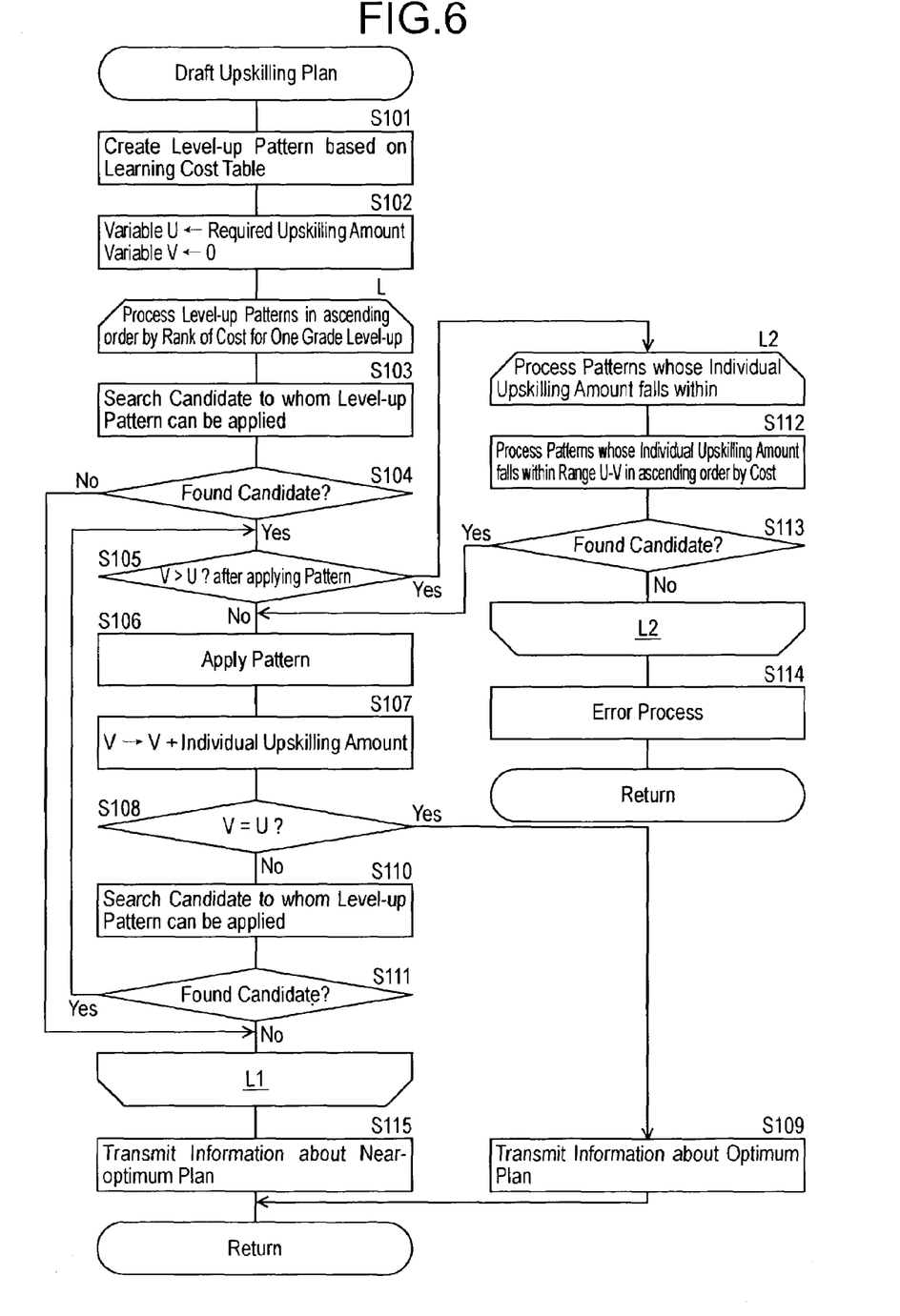
FIG. 6 is a flowchart showing a detail of the process at S7 in FIG. 5.
Figure 7:
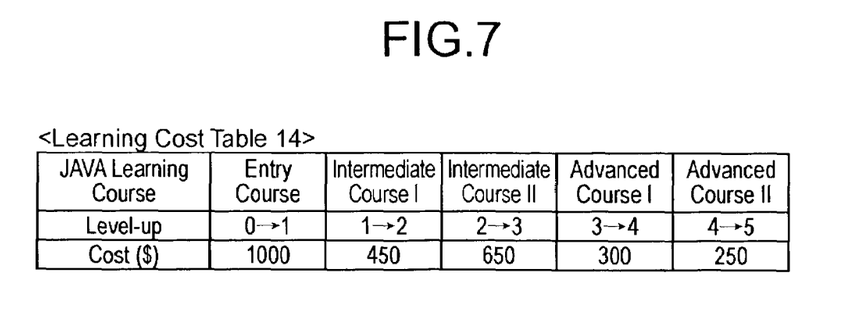
FIG. 7 shows a data layout of a learning cost table.

Hereinafter, the process to draft the upskilling plane will be described with reference to FIG. 6. FIG. 6 is a flowchart showing the process at S7 in FIG. 5 in detail. For the process shown in FIG. 6, a learning cost table 14 shown in FIG. 7 has been created for each skill field. The learning cost table 14 is stored in the memory portion 10H.

The learning cost table 14 includes information about the learning course that should be attended by a worker to improve his or her skill in the skill field in question. For instance, the learning courses about "JAVA" are provided in the table of FIG. 7. That is, "Entry Course", "Intermediate Course I", "Intermediate Course II", "Advanced Course I" and "Advanced Course II" are provided for improving the skill level from 0 to 1, 1 to 2, 2 to 3, 3 to 4 and 4 to 5, respectively. Further, the cost required to attend each of learning courses is listed in the learning cost table 14.

Figure 8:
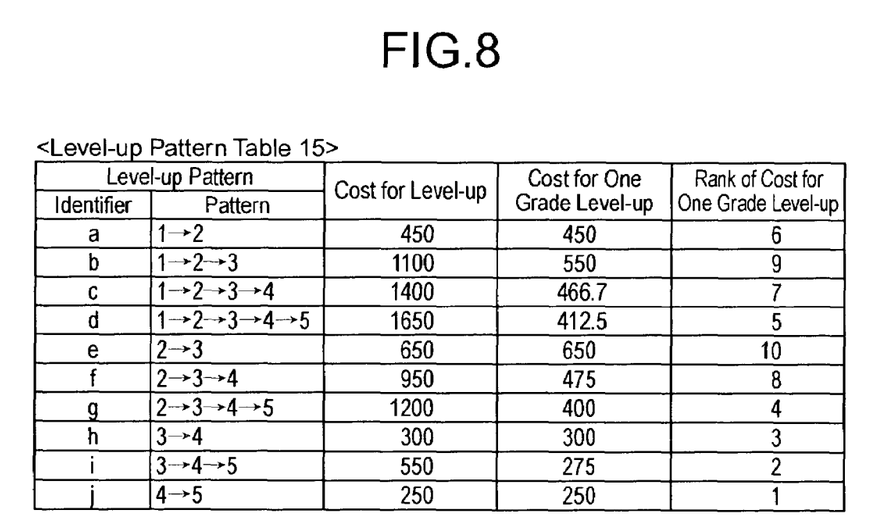
FIG. 8 shows a data layout of a level-up pattern table.

In the flow chart of FIG. 6, the server machine 10 calculates the costs of various patterns to improve the skills of the workers based on the learning cost table 14 (FIG. 7) and creates a level-up pattern table 15 shown in FIG. 8 at S101. All patterns to improve the level of the worker's skill in the skill field in question are provided in the level-up pattern table 15. Identifiers "a" to "j" are uniquely assigned to the respective patterns.

Still further, "Cost for Level-up" that is a cost required by each pattern and "Cost for One Grade Level-up" that is a cost required to improve the skill by one grade for each pattern are stored in the level-up pattern table 15. The "Cost for One Grade Level-up" is quotient of "Cost for Level-up" divided by a number of improved grades (level-up steps). The level-up patterns are ranked in order of increasing "Cost for One Grade Level-up". The rank of each pattern is stored in "Rank of Cost for One Grade Level-up" in the level-up pattern table 15.

For instance, the pattern with the identifier "i" is a plan to improve the skill of JAVA of a worker who is in level "3" to level "5". The worker must attend the "Advanced-level Course I" and the "Advanced-level Course II" shown in FIG. 14 to improve the skill of JAVA from level "3" to level "5". Since the costs of the "Advanced-level Course I" and the "Advanced-level Course II" are $300 and $250, respectively, the "Cost for Level-up" of the pattern with the identifier "i" becomes $550. Since this pattern improves the skill by two grades from level "3" to level "5", the cost for one grade level-up becomes $275 (=$550/2).

The server machine 10 allocates a variable U and stores the required upskilling amount therein and allocates a variable V (an upskilling amount) and stores a initial value "0" therein at S102.

In addition, the server machine 10 executes a process of a first loop L1 for each pattern in the level-up pattern table 15 in ascending order by the corresponding "Rank of Cost for One Grade Level-up". That is, one round of the process of the first loop L1 is executed for one pattern in the level-up pattern table 15.

At S103 in the first loop L1, the server machine 10 refers to the skill holder table 12 (FIG. 3) in the target skill field and searches a candidate among the workers to whom the pattern designated in the current round of the first loop L1 can be applied.

Next, at S104, when a candidate has been found, the server machine 10 goes on the process to S105. Otherwise, the current round of the process in the first loop L1 finishes.

At S105, the server machine 10 causes the process to branch according to the upskilling amount after the designated pattern is applied to the candidate. Specifically, when the upskilling amount (V) calculated by applying the designated pattern to the candidate directly becomes larger than the required upskilling amount (U), the server machine 10 causes the process to branch to a second loop L2. Otherwise, the process goes on to S106.

At S106, the server machine 10 applies the designated pattern to the candidate. Specifically, the server machine 10 registers the information about the appliance of the designated pattern into an upskilling table 16 shown in FIG. 9 and updates the level of the candidate in the skill holder table 12 to the level after applying the pattern in question.

Figure 9:
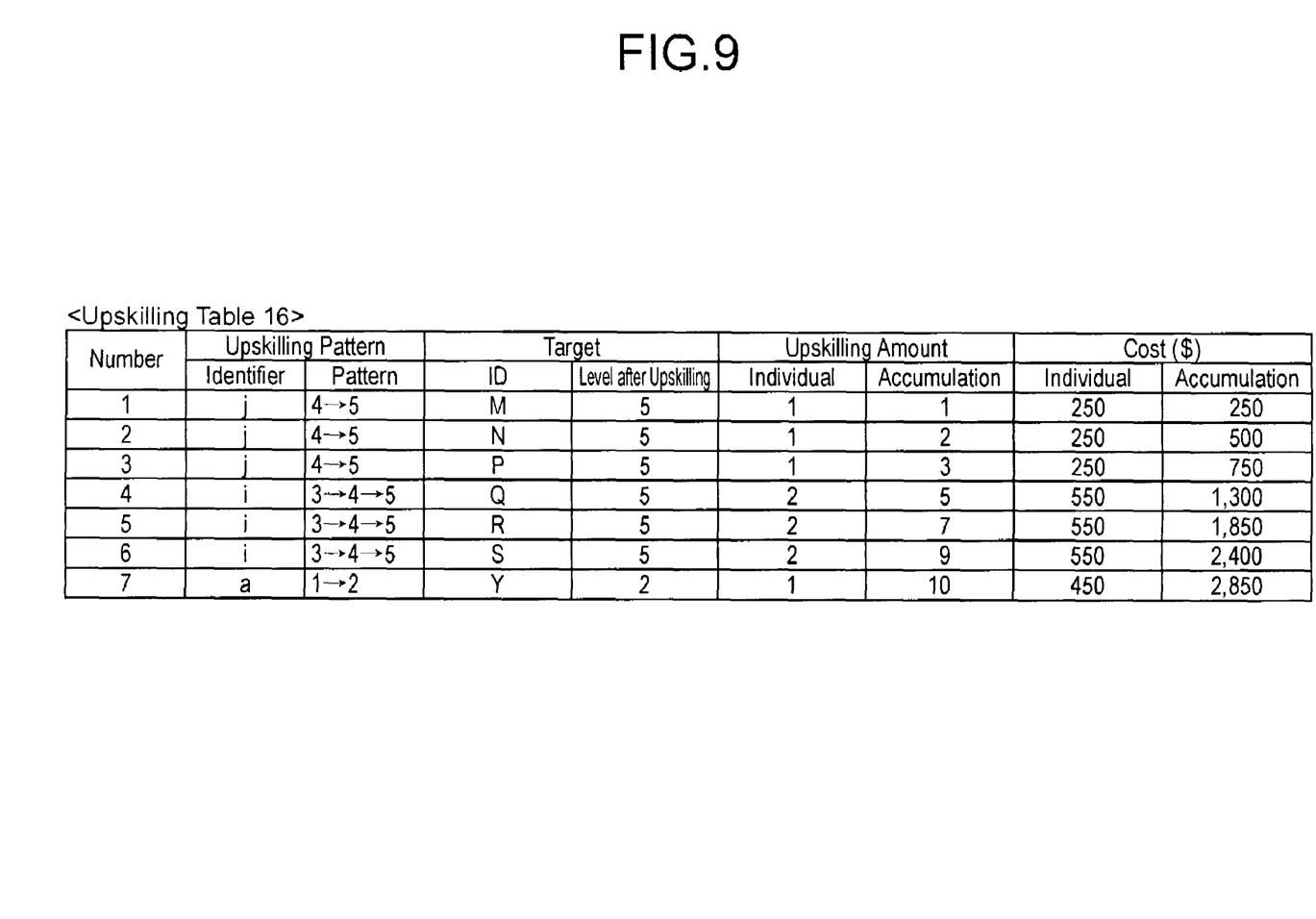
FIG. 9 shows a data layout of an upskilling table.

The upskilling table 16 shown in FIG. 9 includes a plurality of records corresponding to the applied patterns. Each record represents the condition after applying a pattern. Each record of the upskilling table 16 includes categories of "Upskilling Pattern", "Target", "Upskilling Amount" and "Cost". Further, a record includes fields of "Identifier" and "Pattern" in the category "Upskilling Pattern", fields of "ID" and "Level after Upskilling" in the category "Target", fields of "Individual" and "Accumulation" in the category "UpskillingAmount" and fields of "Individual" and "Accumulation" in the category "Cost". The upskilling amount and the cost by applying a single pattern are stored in the fields "Individual" in the categories "Upskilling Amount" and "Cost". The upskilling amount and the cost by applying the patterns in order are stored in the fields "Accumulation" in the categories "UpskillingAmount" and "Cost".

Next, at S107, the server machine 10 adds the individual upskilling amount to the variable V. That is, the variable V after addition keeps the accumulate value of the upskilling amount at the time.

At S108, the server machine 10 causes the process to branch to S109 away from the first loop L1 when the accumulate upskilling amount (V) is equal to the required upskilling amount (U). The process goes on to S110 otherwise.

Figure 10:
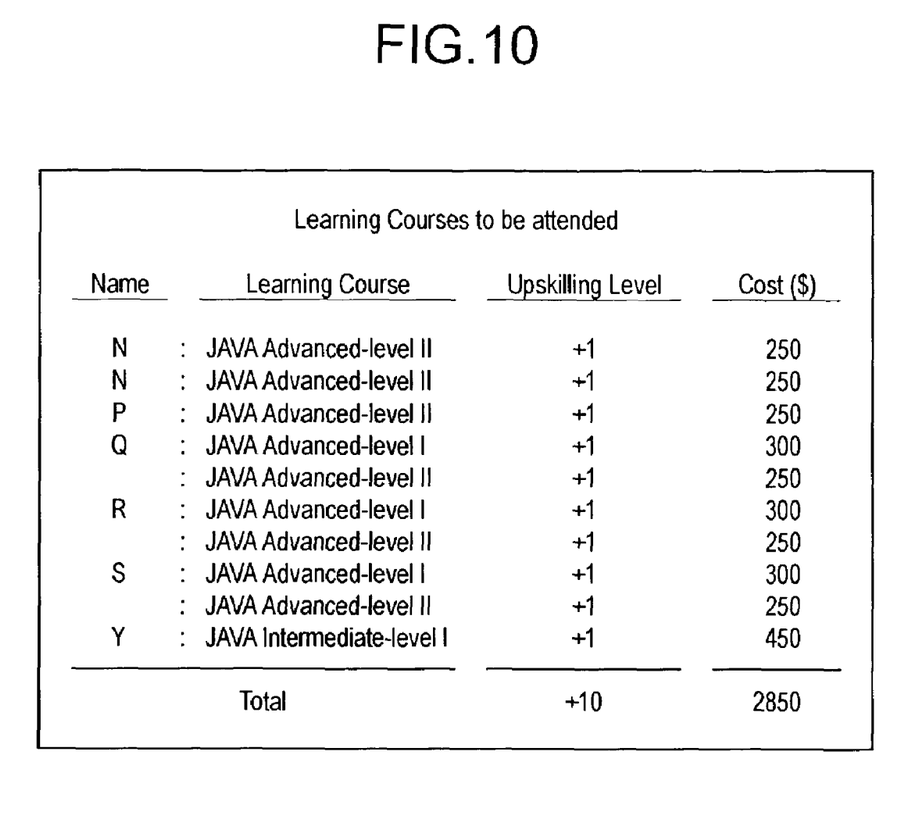
FIG. 10 shows one example of a Web page showing a upskilling plan.

At S109, the server machine 10 transmits screen information about the optimum plan that shows the learning courses to be attended to obtain the same upskilling amount as the required upskilling amount (U) to the client machine 20. The screen information is created as Web data based on the information extracted from the upskilling table 16. The client machine 20 displays a Web page of the upskilling plan including the information about targets who should attend the learning courses and the information about the learning courses on a monitor. FIG. 10 shows one example of the Web page. As shown in FIG. 10, the targets, the learning courses to be attended, the required upskilling amounts and the costs are displayed. A person in charge in a company makes target workers attend necessary learning courses based on the most suitable upskilling plane shown in the Web page. After the process at S109, the server machine 10 finishes the process of the flowchart shown in FIG. 6. The end of the flowchart of FIG. 6 means the end of the process at S7 in the flowchart of FIG. 5.

On the other hand, when the server machine 10 determines that the accumulate upskilling amount (V) is not coincident with the required upskilling amount (U) at S108, the server machine 10 executes, at S110, the process similar to the process at S103. The process at S110 is executed based on the skill holding table 12 updated at S106.

Next, at S111, the server machine 10 goes on the process to S105 when a candidate has been found at S110. The server machine 10 finishes the current round of the first loop L1 otherwise.

Further, if the upskilling amount (V) calculated by applying the designated pattern to the candidate goes beyond the required upskilling amount (U), the server machine 10 causes the process to branch to the second loop L2. The process of the second loop L2 is executed for each pattern whose individual upskilling amount falls within a range U-V in ascending order by the cost. At S112 in the second loop L2, the server machine 10 cancels the candidate who has been already found and executes the process similar to the process at S103 in order to find a next candidate. If a next candidate is found in the process at S112, the server machine 10 causes the process to branch from the second loop L2 to S106 (S113, Yes). Further, if a next candidate is not found (S113, No), the process of the second loop L2 is repeated. If a candidate cannot be found at S112 during the searches of all the patterns that satisfy the condition, the process finishes after an error process at S114.

After the process of the first loop L1 is executed for every pattern, the process exits from the first loop L1 and goes on to S115.

At S115, since the server machine 10 finds the upskilling amount (V) that is not equal to the required upskilling amount (U) but it is near-optimum, the server machine 10 transmits screen information about the near-optimum plan that shows the learning courses to be attended to obtain the upskilling amount nearly equal to the required upskilling amount (U) to the client machine 20. The client machine 20 displays the upskilling plan as shown in FIG. 10 for example on the monitor in the same manner as S109. Then the server machine 10 finishes the process in the flowchart of FIG. 6. The end of the process of the flowchart of FIG. 6 means the end of the process at S7 in the flowchart of FIG. 5. When the process at S7 is finished, the process of the loop L for the current skill field is finished. After the process of the loop L is executed for every skill field, the process of the flowchart of FIG. 5 finishes.

As described above, the skill analysis method of the embodiment analyzes the skill fields that are important for the company and presents the learning courses that should be attended by the workers to properly arrange the skills in the company. Further, the proper arrangement of the skills is planed to minimize the cost required to attend the learning courses. The Web page may display the cost required to attend the learning courses.

According to the skill analysis method and the skill analysis program of the present invention, skills of members in an organization are analyzed to make the important skill field for the organization clear.

What is claimed is:

1. An upskilling plan proposing method executed by a computer, comprising:
   receiving a request from a client organization;
   extracting one or more organizations as an increasing performance organization from among plural organizations that are identical in category to the client organization, the increasing performance organization that a result growth rate on latest period from among consecutive plural periods is more than a predetermined value;
   calculating a skill increase ratio, to first amount of value of skill level that each member of the increasing performance organization has at beginning of the latest period, of second amount of value of skill level that each member of the increasing performance organization has at end of the latest period;
   calculating, as a standard rate, an average of the skill increasing ratio that each increasing performance organization has;
   calculating a skill increase ratio, to third amount of value of skill level that each member of the client organization has at beginning of the latest period, of fourth amount of value of skill level that each member of the client organization has at end of the latest period;
   calculating, as a target rate, an average of the skill increasing ratio that the client organization has;
   calculating a required amount of the value of skill level to be necessary so that the skill increase ratio attains the standard rate when the target rate is less than the standard rate; and
   showing, based on the required amount, a web page of upskilling plan to the client organization, the web page includes information about one or more target members needing upskill and information about a learning course that the one or more target members should attend.

2. The upskilling plan proposing method according to claim 1, wherein said skill increase ratio, said calculating as the standard rate, said calculating the skill increase ratio, said calculating as the target rate and said calculating the required amount are executed for a plurality of skill fields.

3. The upskilling plan proposing method according to claim 1, further comprising step of: selecting the plan with minimum cost among plans to improve the fourth amount of the client organization in order to increase the skill increase ratio.

4. A computer-readable medium recording a program embodied therein, the program causing the computer to execute a method, the method comprising:
   receiving a request from a client organization;
   extracting one or more organizations as an increasing performance organization from among plural organizations that are identical in category to the client organization, the increasing performance organization that a result growth rate on latest period from among consecutive plural periods is more than a predetermined value;
   calculating a skill increase ratio, to first amount of value of skill level that each member of the increasing performance organization has at beginning of the latest period, of second amount of value of skill level that each member of the increasing performance organization has at end of the latest period;
   calculating, as a standard rate, an average of the skill increasing ratio that each increasing performance organization has;
   calculating a skill increase ratio, to third amount of value of skill level that each member of the client organization has at beginning of the latest period, of fourth amount of value of skill level that each member of the client organization has at end of the latest period;
   calculating, as a target rate, an average of the skill increasing ratio that the client organization has;
   calculating a required amount of the value of skill level to be necessary so that the skill increase rate attains the standard rate when the target rate is less than the rate; and
   showing, based on the required amount, a web page of upskilling plan to the client organization, the web page includes information about one or more target members needing upskill and information about a learning course that the one or more target members should attend.

5. A upskilling plan proposing system comprising:

a server having a processor for executing computer instructions; and memory comprising a plurality of memory portions each containing computer instructions;

said memory portions including:

a receiving portion configured to receive a request from a client organization;

an extracting portion configured to extract one or more organizations as an increasing performance organization from among plural organizations that are identical in category to the client organization, the increasing performance organization that a result growth rate on latest period from among consecutive plural periods is more than a predetermined value;

a first calculating portion configured to calculate a skill increasing ratio, to first amount of value of skill level that each member of the increasing performance organization has at beginning of the latest period, of second amount of value of skill level that each member of the increasing performance organization has at end of the latest period;

a second calculating portion configured to calculate, as a standard rate, an average of the skill increasing ratio that each increasing performance organization has;

a third calculating portion configured to calculate a skill increase ratio, to third amount of value of skill level that each member of the client organization has at beginning of the latest period, of fourth amount of value of skill level that each member of the client organization has at end of the latest period;

a fourth calculating portion configured to calculate, as a target rate, an average of the skill increasing ratio that the client organization has;

a fifth calculating, portion configured to calculate a required amount of the value of skill level to be necessary so that the skill increase rate attains the standard rate when the target rate is less than the standard rate; and a showing portion configured to show, based on the required amount, a web page of upskilling plan to the client organization, the web page includes information about one or more target members needing upskill and information about a learning course that the one or more target members should attend.

* * * * *

UNITED STATES PATENT AND TRADEMARK OFFICE
CERTIFICATE OF CORRECTION

| | | |
|---|---|---|
| PATENT NO. | : 7,483,843 B2 | Page 1 of 1 |
| APPLICATION NO. | : 10/284300 | |
| DATED | : January 27, 2009 | |
| INVENTOR(S) | : Kazuaki Honda et al. | |

It is certified that error appears in the above-identified patent and that said Letters Patent is hereby corrected as shown below:

Column 8, Lines 24-25, change "wherein said skill increase ratio, said calculating as the standard rate, said calculating the skill increase ratio, said" to --wherein said calculating the skill increase ratio to first amount, said calculating as the standard rate, said calculating the skill increase ratio to third amount, said--.

Signed and Sealed this

Sixteenth Day of June, 2009

JOHN DOLL
*Acting Director of the United States Patent and Trademark Office*